US009405588B2

(12) United States Patent
Stolyar

(10) Patent No.: US 9,405,588 B2
(45) Date of Patent: Aug. 2, 2016

(54) CLOUD RESOURCE ALLOCATION SYSTEM AND METHOD

(75) Inventor: Aleksandr Stolyar, Basking Ridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1007 days.

(21) Appl. No.: 13/474,773

(22) Filed: May 18, 2012

(65) Prior Publication Data

US 2013/0311662 A1 Nov. 21, 2013

(51) Int. Cl.
*G06F 15/173* (2006.01)
*G06F 9/50* (2006.01)
*G06F 9/455* (2006.01)

(52) U.S. Cl.
CPC .......... *G06F 9/5061* (2013.01); *G06F 9/45558* (2013.01); *G06F 9/5027* (2013.01); *G06F 9/5077* (2013.01); *G06F 2009/4557* (2013.01); *G06F 2009/45562* (2013.01)

(58) Field of Classification Search
CPC .............. G06F 9/45558; G06F 9/5077; G06F 2009/45562
See application file for complete search history.

(56) References Cited

U.S. PATENT DOCUMENTS 8,234,640 B1 * 7/2012 Fitzgerald et al. ................ 718/1
2011/0161957 A1 * 6/2011 Bernardi et al. .................. 718/1
2012/0240114 A1 * 9/2012 Muller ............................. 718/1
2013/0212576 A1 * 8/2013 Huang et al. ...................... 718/1
2013/0227699 A1 * 8/2013 Barak et al. ..................... 726/26

* cited by examiner

*Primary Examiner* — Richard G Keehn
(74) *Attorney, Agent, or Firm* — Carlson, Gaskey & Olds, P.C.

(57) ABSTRACT

Assigning virtual machines to host machines in a cloud computing arrangement includes at least one of several techniques that facilitate reducing or minimizing the number of host machines serving virtual machines. One technique includes using place holders in place of a virtual machine that vacates a host machine. The place holders indicate the type of vacated virtual machine and are replaced with a new virtual machine request of a corresponding type. Another technique includes a greedy assignment algorithm for identifying a host machine for a new virtual machine request that will yield an optimized increment to a value of a function that corresponds to a current cloud resource allocation. One technique includes using a modified version of a derivative of the function used in the greedy assignment algorithm, with the modification depending on a number of virtual machines in the cloud system at the time of the new request.

13 Claims, 2 Drawing Sheets

45

Determine a Type of a New Virtual Machine Request — 46

Does a Place Holder of Same Type as New Virtual Machine Request Exist? — 48

Yes

No

Assign New Virtual Machine Request to a Host Machine Having a Place Holder in Place of the Place Holder — 50

52 — Assign New Virtual Machine Request to One of the Host Machines Using Algorithm Based on Minimizing Function Increment

CLOUD RESOURCE ALLOCATION SYSTEM AND METHOD

BACKGROUND

Cloud computing is growing in popularity. A cloud service provider operates one or more data centers to provide computing or data storage services to customers. Each data center typically includes a plurality of host machines. Customers run virtual machines on the host machines for performing the customer's desired computing task. Multiple virtual machines may run simultaneously on one host machine.

While cloud services open up new possibilities for customers and service providers, they introduce new challenges. For example, a server or host machine has a limited capacity and there must be control over virtual machine assignments to that server or host machine. Additionally, virtual machine requests arrive randomly in time. Virtual machine instances may be running at one moment and stopped at the next. Any number of virtual machine requests may arrive at any particular scheduling interval. The randomness of arrival of new virtual machine requests and the randomness of a length of time during which a virtual machine will be running present challenges for assigning virtual machine requests to host machines in an efficient manner.

SUMMARY

Several devices and methods for managing cloud computing resources are disclosed below that facilitate reducing or minimizing a number of host machines serving virtual machines.

An exemplary device for managing cloud computing resources has at least one computing device including digital data storage and a processor. The digital data storage contains information regarding a cloud computing resource allocation including a plurality of virtual machine type values. The respective type values correspond to a number of the respective virtual machine types associated with at least one of a plurality of host machines. The processor is configured to determine the type of one vacated virtual machine that vacates a host machine and to assign a place holder to one of the host machines. The place holder has a place holder type that corresponds to the type of the vacated virtual machine. The processor determines the type of a virtual machine of that request. The processor is configured to assign the virtual machine request to a selected one of the host machines based on a correspondence between the type of the virtual machine request and the place holder type of a place holder assigned to the selected host machine.

Another exemplary device for managing cloud computing resources has at least one computing device including digital data storage and a processor. The digital data storage contains information regarding a cloud computing resource allocation the digital data storage comprising information regarding a cloud computing resource allocation including a plurality of virtual machine type values. The respective virtual machine type values correspond to a number of virtual machines of the respective type associated with at least one of a plurality of host machines. The processor is configured to determine that there is a virtual machine request. The processor determines a first value of a function that corresponds to the resource allocation prior to assigning the virtual machine request to one of the host machines and a plurality of second values of the function. The respective second values correspond to the virtual machine request being assigned to a different one of the host machines. The processor is configured to assign the virtual machine request to the host machine having the corresponding second value that yields an optimized increment to the first value.

An exemplary method of managing cloud computing resources, which include a plurality of host machines configured to serve a plurality of virtual machines, includes determining the type of one vacated virtual machine that vacates a host machine and to assigning a place holder to one of the host machines. The place holder has a place holder type that corresponds to the type of the vacated virtual machine. The type of a virtual machine of a virtual machine request is determined. The virtual machine request is assigned to a selected one of the host machines based on a correspondence between the type of the virtual machine request and the place holder type of a place holder assigned to the selected host machine.

Another exemplary method of managing cloud computing resources, which include a plurality of host machines configured to serve a plurality of virtual machines, includes determining that there is a virtual machine request. A first value of a function that corresponds to the resource allocation prior to assigning the virtual machine request to one of the host machines is determined. A determination is made regarding a plurality of second values of the function. Each of the second values corresponds to the virtual machine request being assigned to a different one of the host machines. The virtual machine request is assigned to the host machine having the corresponding second value that yields an optimized increment to the determined current value.

The various features and advantages of disclosed example embodiments will become apparent to those skilled in the art from the following detailed description. The drawings that accompany the detailed description can be briefly described as follows.

DETAILED DESCRIPTION

Figure 1:
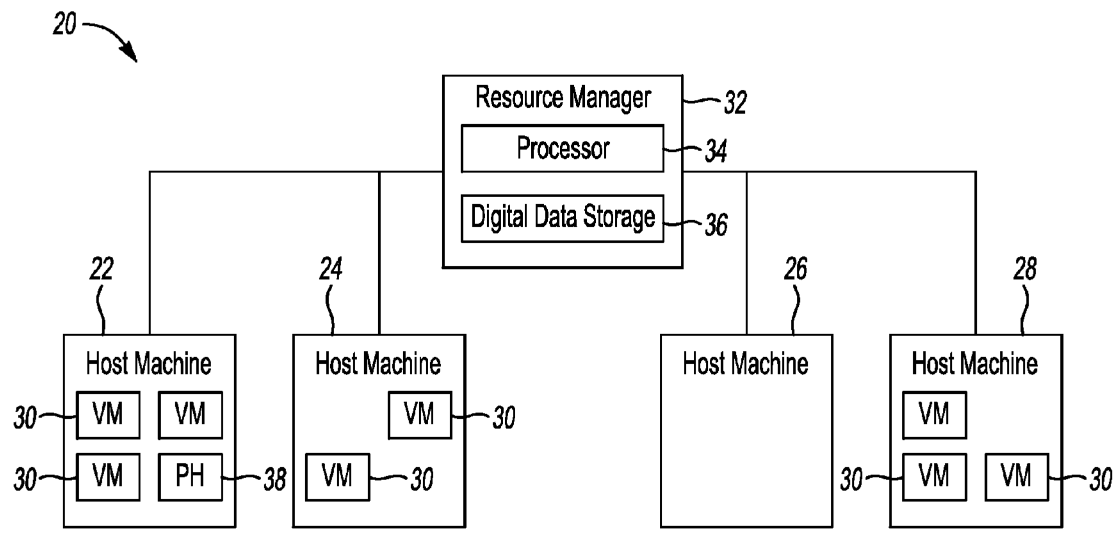
FIG. 1 schematically illustrates selected portions of an example cloud computing arrangement designed according to an embodiment of this invention.

FIG. 1 schematically shows a cloud computing system 20. A plurality of host machines 22, 24, 26, 28 are each configured to serve a plurality of virtual machines 30. The host machines 22-28 in some examples are part of a single data center operated by a cloud service provider. In other examples, the host machines 22-28 may be portions of different data centers. Further, the host machines 22-28 may be geographically remote from each other.

The example of FIG. 1 includes a resource manager device 32 for managing cloud computing resources. The example resource manager 32 includes a processor 34 and digital data storage 36. The digital data storage includes information regarding a resource allocation of the cloud computing resources of the system 20. The information in the digital data storage includes indications of a number of host machines serving virtual machines, a number of virtual machines on each of the host machines and a type of each of the virtual machines. In this example, each of the virtual machines 30 is of a known type. The number of virtual machines of each type currently served by each of the host machines is kept as part of an indication of the current resource allocation maintained in the digital data storage 36. In one example, the digital data storage 36 contains a vector for each host machine. Each vector has a number of vector components that each correspond to the types of virtual machine 30 that could be served by that host machine. The value of each vector component corresponds to the number of virtual machines of that type.

In some embodiments less than all of the host machines of a particular data center or cloud system will be involved in the processes disclosed in this description. The word "each" when used to refer to the host machines should not be construed in the strictest sense such that it would require all or every one of the host machines to be involved. In some embodiments only a selected portion of the host machines may be involved in a disclosed process or a particular step of a process. The same is true when the word "each" is used in connection with virtual machines or virtual machine types.

The resource manager device 32 utilizes at least one of several strategies for assigning virtual machines 30 to the host machines 22-28 in a manner that optimizes the number of host machines currently being used for serving virtual machines. In some embodiments, an optimized number of host machines is the fewest number of host machines necessary to serve a plurality of running virtual machines. In other words, in some embodiments, the resource manager device 32 assigns new virtual machine requests to one of the host machines 22-28 so that the total number of host machines in use is minimized.

For discussion purposes, each of the host machines 22-28 may be considered to have the same capabilities for serving virtual machines. At any time a host machine simultaneously contains a set of virtual machines that can be represented by a vector $k=(k_1, \ldots, k_I)$, where a type of virtual machine is designated i, there are I total types of virtual machine, and $k_i$ is the number of type i virtual machines running on that host machine. Since there are I types of virtual machines, the corresponding vector k has I components $k_i$. If the host machine is not serving any virtual machine of a particular type, the value of the corresponding component $k_i$ is zero in some examples.

Provided that a host machine has sufficient capacity, another virtual machine may be assigned to that host machine. By minimizing the number of host machines that are actively serving one or more virtual machines, the available data center capacity can be maximized. Additionally, any host machine that is idle (e.g., not serving a virtual machine) could be turned off to save energy or could be allocated to some other function on a temporary basis, such as maintenance or a dedicated data center function other than serving virtual machines.

In the example of FIG. 1, the host machines 22, 24 and 28 are each currently serving at least one virtual machine 30. Each of those host machines is currently serving more than one virtual machine 30 in the illustrated state of the cloud resources.

In FIG. 1, the host machine 22 includes a place holder 38. In this example, the place holder 38 has an assigned type that corresponds to one of the types of virtual machines. In particular, the type of the place holder 38 corresponds to the type of a virtual machine that recently vacated at least one of the host machines 22-28. The place holder 38 is counted as if it were a virtual machine served by the host machine 22. The place holder 38 facilitates assigning a new virtual machine request to the host machine 22.

Each place holder is assigned to a host machine. One embodiment includes comparing the host machine from which the virtual machine just departed as to a different, randomly selected one of the host machines. In this embodiment, the resource manager device 32 determines whether there would be a smaller increment of some function, depending on the overall system state, if the place holder is assigned in place of the virtual machine that just vacated one of the host machines or the different, randomly chosen one of the host machines. Some of these embodiments include using a selected probability q of randomly and uniformly choosing one of the host machines that is currently already serving at last one virtual machine and a complimentary probability $(1-q)$ of choosing any host machine, which is not currently serving any virtual machines. Some of these embodiments include selecting a host machine deterministically so that the increment of some function, depending on the overall system state, is optimized. In some embodiments, an optimized increment is the smallest increment.

Figure 2:
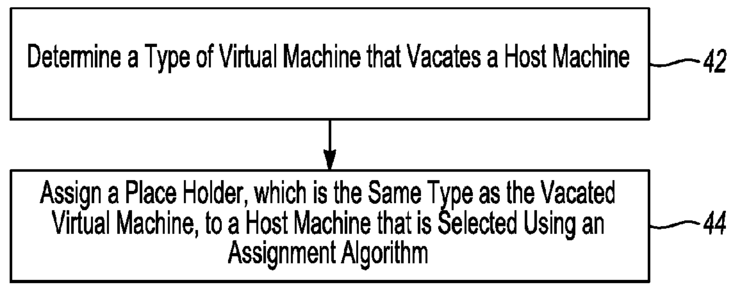
FIG. 2 is a flowchart diagram summarizing an example technique for assigning place holders as part of a cloud resource allocation strategy.

FIG. 2 includes a flowchart diagram 40 that summarizes an example approach for assigning place holders, such as the place holder 38, to a host machine. At 42, a determination is made of a type of virtual machine that vacates one of the host machines. As known, virtual machines will require service for a random amount of time, depending on the needs of the customer utilizing that virtual machine. In this example, the resource manager device 32 detects whenever a virtual machine vacates one of the host machines 22-28. When that occurs, the resource manager device 32 determines the type of the vacated virtual machine.

At 44, the resource manager device 32 assigns a place holder, such as the place holder 38, of the same type as the type of the vacated virtual machine. The place holder, which is considered the same as a virtual machine, is assigned to one of the host machines. Depending on the particular embodiment, the resource manager device 32 selects the host machine for the assignment according to one of several possible assignment algorithms. One approach, which is summarized in FIG. 4 and described below, is used as the assignment algorithm for new virtual machines in some examples. Another approach includes assigning the place holder to the host machine that was serving the vacated virtual machine or to a randomly selected one of the host machines, whichever causes the increment of some function, depending on the overall system state, to be smaller.

Figure 3:
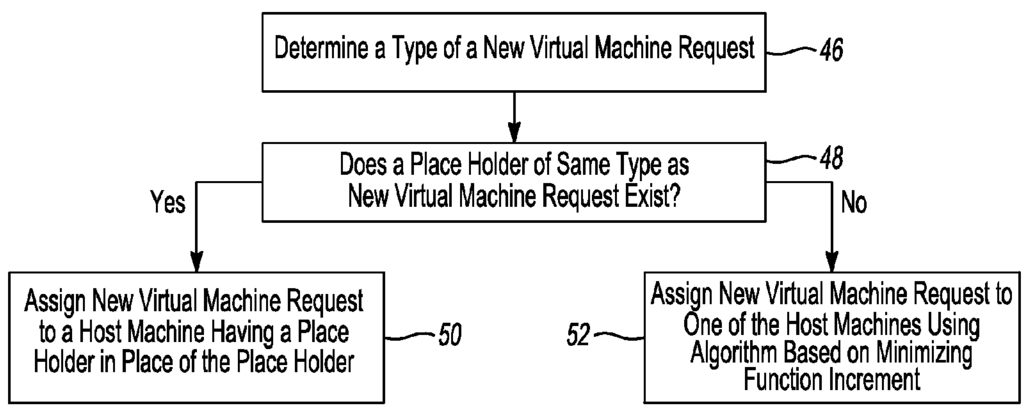
FIG. 3 is a flowchart diagram summarizing assigning a virtual machine to a host machine using a place holder in an example cloud resource allocation strategy.

At some time a new virtual machine request is received from a customer requesting cloud computing services. An example procedure for using place holders to facilitate assigning the new virtual machine request to a host machine is summarized in the flowchart 45 of FIG. 3. The type of the new virtual machine request is determined at 46. The resource manager device 32 determines at 48 whether there are any place holders assigned to any of the host machines corresponding to the type of virtual machine of the new service request. If there are any place holders whose type corresponds to the type of new virtual machine request, the resource manager device 32 assigns the new virtual machine to one of the host machines having a place holder of the corresponding type at 50. That place holder is replaced by the new virtual machine request for purposes of maintaining an accurate count of the number of virtual machines being served by that host machine. In one example, the selection of the place holder is arbitrary if there is more than one place holder whose type corresponds to the type of the virtual machine of the new request. Otherwise, if there are no place holders of a corresponding type as the new virtual machine, the virtual machine is assigned directly to one of the host machines according to the assignment algorithm.

In some embodiments the correspondence between the type of the place holder and the type of the new virtual machine request is based on the respective types of machine requiring similar resource allocations. In some embodiments the corresponding types will always be the same. In other embodiments the corresponding types will not always be the same but there will be sufficient correspondence between the types to consider them essentially the same for assignment purposes.

One feature of the example place holder technique is that each place holder has a limited duration. The place holder is set to expire a preselected amount of time after it has been assigned to a host machine. In one example, the time out for each place holder 38 is set based upon an exponentially distributed random variable.

An expired place holder is removed from the host machine and no longer contributes to the count of virtual machines served by that host machine. Maintaining place holders for at least a limited time allows for assigning new virtual machine requests to host machines in a manner that contributes to achieving the goal of reducing or minimizing the number of host machines needed for serving virtual machines within the cloud system 20.

Whether assigning a place holder to one of the host machines or assigning a new virtual machine request directly to a host machine, the resource manager device 32 uses an assignment algorithm that contributes to the goal of reducing or minimizing the number of host machines serving running virtual machines. One example includes using a greedy algorithm that takes into account the current resource allocation. The processor 34, for example, utilizes information from the digital data storage 36 for assessing the current resource allocation including the number of host machines currently serving virtual machines. The processor 34 utilizes that information for selecting the host machine to which the place holder or new virtual machine request will be assigned.

Figure 4:
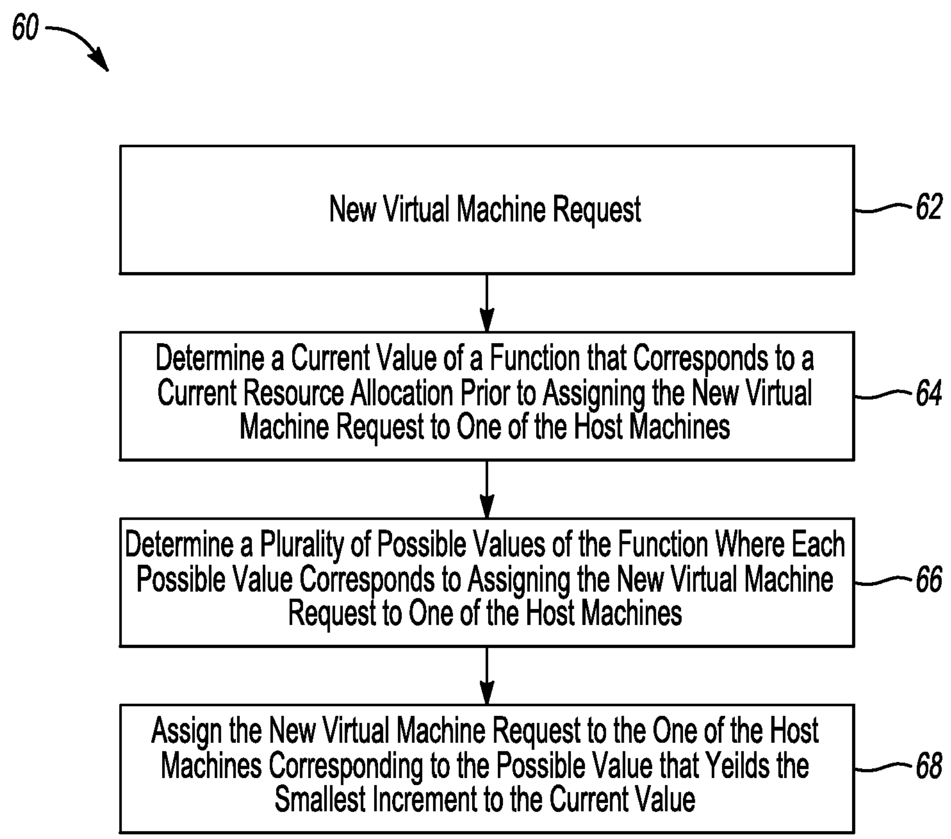
FIG. 4 is a flowchart diagram summarizing an example virtual machine assignment strategy.

FIG. 4 includes a flowchart diagram 60 summarizing an example greedy assignment strategy. For purposes of discussion, FIG. 4 focuses on the assignment of a new virtual machine request. For examples that include using place holders as described above, the same assignment strategy may be used for assigning the place holder, such as at 44 in FIG. 2.

At 62 a new virtual machine request is received. At 64 a determination is made regarding a current value of a function that corresponds to the current resource allocation. At this point, the new virtual machine request has not yet been assigned to one of the host machines. The current resource allocation, therefore, comprises the number of host machines currently serving virtual machines.

The illustrated example includes a function that corresponds to the resource allocation. That function is based upon the vectors k for each of the host machines. For discussion purposes, it is possible to consider $X_k$ to be the number of host machines having a configuration described by the vector k in the current resource allocation. One objective can be expressed as minimizing the following summation $$\sum_k X_k^{1+a}$$

where α is ≥0 and is a fixed parameter. When α=0, this corresponds to the objective of minimizing the number of host machines serving running virtual machines.

It is possible to realize the function F(X) where X is the vector having components $X_k$, so that the vector X describes the resource allocation (i.e., all of the host machines serving virtual machines). The function F(X) can be advantageously chosen so that it is monotone non-decreasing function in each component $X_k$. A type i virtual machine request arriving at a time t is added to an available configuration k such that the increment F(X(t))−F(X(t−)) is minimized. In this example, X(t−) is the state of the resource allocation prior to assigning the additional new virtual machine request and X(t) is the state of the resource allocation just after the assignment of the new request. The host machines considered for the assignment are those with the current configuration k including those having a value k=0 (that is—idle host machines) or those with $X_k(t-)>0$. In this example, $X_{k+e_i}(t)=X_{k+e_i}(t-)+1$ and (unless k=0) $X_k(t)=X_k(t-)-1$; here $e_i$ denotes the unit vector with the $i^{th}$ component equal to 1 and all other components equal to zero.

The current value of the function F(X) provides an indication of the current resource allocation. At 66, the resource manager device 32 determines a plurality of possible values of F(X). Each possible value corresponds to assigning the new virtual machine request to one of the host machines. Each of the possible values can then be compared to the current value, which corresponds to the current resource allocation prior to assigning the new request to a host machine.

At 68 in FIG. 4 the new virtual machine request is assigned to the one of the host machines corresponding to the possible value that yields a smallest increment to the current value. Minimizing the increment between the current value of the function that describes the resource allocation and an incremented value of that function based upon the new virtual machine assignment contributes to accomplishing the goal of maintaining a minimum number of host machines serving virtual machines.

In some examples, an expression involving derivative functions $W_k(X)=dF(X)/dX_k$ is used in place of the function F(X). The derivative functions in some examples simplify consideration of the effects of assigning a new virtual machine request to various ones of the host machines. An expression involving the derivative function is used in place of the "function" in FIG. 4, for example, to determine the current value and the plurality of possible values for greedily assigning the new virtual machine request (or new place holder) to one of the host machines.

Suppose for each k∈K a function $W_k(X)$ is given. Advantageously, the derivative function $W_k(X)=dF(X)/dX_k$ can be used. A type i virtual machine request arriving at time t is added to an available configuration k (with either k=0 or $X_k(t-)>0$) such that the difference $W_{k+e_i}(X_k(t-))-I\{k\neq 0\}W_k(X_k(t-))$ is the smallest. Here $I\{k\neq 0\}$ takes value 1 if configuration k is not the vector with all zero components, and value 0 otherwise.

In some situations, the function F(X) is linear or essentially linear. The derivative approach will not provide useful results for such situations. Some examples include another assignment strategy that includes using weight functions $W_k(X)$ that are not the derivatives of F(X). One example includes setting the weights for a particular configuration k of virtual machines to a minimum of a constant or a variable that is dependent on a total number of virtual machines in the cloud 20.

In one example, the constant is $c_k$. In some examples, $c_k$ is set to the value of 1.

In this example, the variable that depends on the total number of virtual machines in the cloud is $X_k/Z^p$, where $X_k$ is number of host machines having the configuration k of virtual machines, Z is the total number of virtual machines served by all host machines in the cloud and p is a fixed parameter having a value in the range ½>p>1. Maintaining the relationship $W_k(X)=\min\{c_k, X_k/Z_p\}$ ensures that as $W_k(X)$ provides a useful result for the assignment algorithm even when the function F(X) is linear or essentially linear.

In one example, the weighting of $W_k(X)$ will be set to the constant $c_k=1$ if $X_k$ is greater than $Z^p$ and will be set to $X_k/Z^p$ if $X_k$ is less than $Z^p$. In other words, the weights $W_k(X)$ become dependent on the value of $X_k$ when $X_k$ is small with respect to the total number of virtual machines. In this example, the value of $Z^p$ can be considered a threshold. Whenever the number of host machines having the configuration k (i.e., $X_k$) is below that threshold, then $W_k(X)$ is set to $X_k/Z^p$ because $c_k$ equals 1 in this example. Using this approach provides for the assignment algorithm to approach an optimal solution as the size of the system increases (e.g., the number of virtual machines increases).

The disclosed example devices and techniques allow for efficiently assigning new virtual machine requests to host machines within a cloud. The disclosed use of place holders, the disclosed greedy assignment algorithm, the disclosed use of weights depending on a derivative function or a combination of these facilitates reducing or minimizing the number of host machines required to serve the virtual machines within the cloud. While each of the disclosed techniques and devices can be used independent of the others, some implementations will combine one or more features of each.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A device for managing cloud computing resources, comprising:

- at least one computing device including a digital data storage and a processor associated with the digital data storage;
- the digital data storage comprising information regarding a cloud computing resource allocation including a plurality of virtual machine type values, the respective virtual machine type values corresponding to a number of virtual machines of the respective type associated with at least one of a plurality of host machines;
- the processor being configured to
  - determine the type of one vacated virtual machine that vacates one of the host machines;
  - assign a place holder to one of the host machines, the place holder having a place holder type corresponding to the type of the vacated virtual machine, the place holder being distinct from the vacated virtual machine;
  - determine the type of a virtual machine request; and
  - assign the virtual machine request to a selected one of the host machines based on correspondence between the type of the virtual machine request and the place holder type of a place holder assigned to the selected host machine.

2. The device of claim 1, wherein

- the place holder is counted as a virtual machine; and
- the processor is configured to replace the place holder of the selected one of the host machines with the assigned virtual machine of the virtual machine request.

3. The device of claim 1, wherein the correspondence between the type of the virtual machine request and the place holder type of the place holder assigned to the selected host machine comprises the place holder type being the same as the type of the virtual machine request.

4. The device of claim 1, wherein the processor is configured to

- determine a first value of a mathematical function that corresponds to the resource allocation prior to assigning the place holder;
- determine a plurality of second values of the mathematical function, each of the second values corresponding to the place holder being assigned to a different one of the host machines; and
- assign the place holder to the host machine having the corresponding second value that yields an optimized increment to the first value.

5. The device of claim 1, wherein the place holder expires a preselected time after being assigned to the one of the host machines.

6. The device of claim 1, wherein the processor is configured to

- determine that there are no place holders having a place holder type corresponding to the type of the virtual machine request at a time of the virtual machine request; and
- assign the virtual machine request to one of the host machines using a greedy assignment algorithm.

7. A method of managing cloud computing resources, which include a plurality of host machines configured to run a plurality of virtual machines, the method comprising:

- determining a type of one vacated virtual machine that vacates one of the host machines;
- assigning a place holder to one of the host machines, the place holder having a place holder type corresponding to the type of the vacated virtual machine and the place holder being distinct from the vacated virtual machine;
- determining the type of a virtual machine request; and
- assigning the virtual machine request to a selected one of the host machines based on correspondence between the type of the virtual machine request and the place holder type of a place holder assigned to the selected host machine.

8. The method of claim 7, comprising

- counting the place holder as a running virtual machine; and
- replacing the place holder of the selected one of the host machines with the assigned virtual machine of the virtual machine request.

9. The method of claim 7, wherein the correspondence between the type of the virtual machine request and the place holder type of the place holder assigned to the selected host machine comprises the place holder type being the same as the type of the virtual machine request.

10. The method of claim 7, wherein the place holder expires a preselected time after being assigned to the selected one of the host machines.

11. The method of claim 7, comprising

- determining a first value of a mathematical function that corresponds to the resource allocation prior to assigning the place holder;
- determining a plurality of second values of the mathematical function, each of the second values corresponding to the place holder being assigned to a different one of the host machines; and
- assigning the place holder to the host machine having the corresponding second value that yields an optimized increment to the first value.

12. The method of claim 7, wherein the optimized increment comprises a smallest increment.

13. The method of claim 7, comprising determining that there are no place holders having a place holder type corresponding to the type of the virtual machine request at a time of the virtual machine request; and assigning the virtual machine request to one of the host machines using a greedy assignment algorithm.

* * * * *